United States Patent [19]

Devienne et al.

[11] 4,054,169
[45] Oct. 18, 1977

[54] INNER TUBE ASSEMBLY FOR RUN-FLAT TIRES

[75] Inventors: André M. Devienne, Compiegne; Gilbert L. Igea, Clairoix, both of France

[73] Assignee: Uniroyal S.A., Clairoix, France

[21] Appl. No.: 703,339

[22] Filed: July 8, 1976

[30] Foreign Application Priority Data

July 18, 1975 France .................. 75.22609

[51] Int. Cl.[2] ............................................. B60C 5/06
[52] U.S. Cl. ................................. 152/337; 152/341; 137/517
[58] Field of Search .................. 152/337–342, 152/349, 399, 400; 137/517

[56] References Cited

U.S. PATENT DOCUMENTS

| 506,550 | 10/1893 | Rosentreter | 152/337 |
| 804,088 | 11/1905 | Blakeslee | 152/337 |
| 1,424,824 | 8/1922 | Johnson et al. | 152/337 |
| 1,432,333 | 10/1922 | Harmon | 152/337 |
| 2,898,969 | 8/1959 | Pfeiffer | 152/341 |
| 3,126,936 | 3/1964 | Beckadolph | 152/341 |

*Primary Examiner*—Drayton E. Hoffman
*Attorney, Agent, or Firm*—Jack Posin

[57] ABSTRACT

An inner tube assembly for a pneumatic tire is disclosed. The assembly includes a pair of inner tube systems, one of which surrounds the other and intercommunicates therewith via a valve unit that is adapted to allow a pneumatic fluid to flow unidirectionally from the inner one of such tube systems to the outer one of said tube systems and effect an equilibrium of pressure. The valve unit, however, is adapted to close when the outer one of such tube systems is punctured and undergoes a pressure drop relative to the inner one of such tube systems, thereby to pneumatically isolate the interiors of such tube systems from one another.

9 Claims, 6 Drawing Figures

INNER TUBE ASSEMBLY FOR RUN-FLAT TIRES

BACKGROUND OF THE INVENTION

The instant invention relates generally to a safety device for pneumatic tires, and more particularly to an inner tube type of device for tubeless pneumatic tires having "run-flat" capabilities.

In the current state of the art, there are already known tubeless pneumatic tires which are characterized as being "puncture-proof" and which when punctured can run at certain speeds for certain periods of time. Such tires are capable of running either in an entirely flat condition or in a substantially deflated state when they are locally punctured, perforated, or pierced. These pneumatic tires have attendent disadvantages in that they are excessively heavy and expensive. Moreover, when such tires are used in a flat or substantially flat condition, they are uncomfortable and wear out at an excessive rate. Furthermore, such tires require special design and shape, and must be mounted on a vehicular wheel rim of corresponding design. As a result, the combination of such a tire and its corresponding vehicular wheel rim is excessively costly and complex.

The purpose of the present invention is to eliminate the aforesaid drawbacks by providing an improved "run-flat" pneumatic tire safety device that can be used effectively with conventional pneumatic tires and conventional vehicular wheel rims.

SUMMARY OF THE INVENTION

To this end, the invention is in the form of an inner tube for restraining the tire beads against the opposite vehicular rim flanges, and comprises:

a. A first or primary inflatable, endless, annular inner tube made of a pliable, but substantially inextensible material to retain a substantially constant or invariable cross-sectional configuration, and designed to surround completely a wheel rim while being housed in the hollow of such rim. The inner tube has an outer diameter that, in the mounted inflated state, is remotely spaced from the inner diameter of the crown region of the pneumatic tire in its mounted inflated state, the tube having a conventional inflation valve designed to project through the wheel rim so as to be accessible from the outside.

b. A second inner tube made of an elastically extensible material circumferentially surrounding contiguously and coaxially the first said inner tube. The second tube is disposed between the first tube and the tire crown region and, in its inflated state, fills the empty space between the tire sidewalls and crown region. The second tube is detachably secured to the first tube through the intermediary of a special valve designed with an automatic open-and-shut mechanism to establish a pressure equilibrium between the interiors of the two tubes and allow both to be simultaneously inflated.

Preferably, but not necessarily, and according to another feature of the invention, the outer diameter of the aforesaid first inner tube in its inflated mounted condition is greater than the maximum diameter of the outer flange edges of the wheel rim.

According to another feature of the present invention, in a modified form thereof, the aforesaid second inner tube is segmented such that it presents a number of inflatable pockets that abut one another in series circumferentially and communicate each with the interior of the first inner tube by means, for example, of the aforementioned special valve or valves having the automatic open-and-shut mechanism.

According to yet another feature of the present invention, in a modified form thereof, the second inner tube is in the form of a plurality of pockets that abut one another in circumferential series and also in two parallel circumferential rows that are contiguous axially of the tube and joined substantially along the equatorial plane of the tire.

Thus, the second inner tube assembly can be made up either by a plurality of annular inner tubes placed side by side around the first inner tube, or by a plurality of rows of small pockets or balloons placed side by side around the first inner tube, or further by a combination of annular chambers and rows of small pockets comprising at the same time one or a plurality of annular chambers and one or a plurality of rows of small pockets arranged side by side around the first inner tube.

These arrangements offer the following advantages:

a. In order to inflate the pneumatic tire in accordance with the present invention, all that is required is to feed compressed air through the single conventional valve of the first inner tube, thereby bringing about the simultaneous inflation of the first inner tube and of each portion of the second inner tube assembly. It is the aforementioned special valve or valves of automatic open-and-shut capacity that equalize the pressure between the first and second inner tubes. Conversely, for the purpose of deflating the pneumatic tire, all that is needed is to push down manually the inside pin of the single conventional inflating valve of the first inner tube, thereby permitting the air to escape therefrom. The air in the pockets of the second inner tube will simultaneously escape into and thence out of the first inner tube via the automatic pressure equilibrium valves associated therewith.

b. The moment a single pocket of the second inner tube is punctured, there occur automatically the following phenomena:

1. If the pneumatic tire is one that comprises only a single second inner tube unit made up of only a single annular chamber, the moment such chamber is punctured, it deflates completely. The aforesaid special valve with the automatic open-and-shut mechanism immediately closes at such time as a result of the greater pressure prevailing within the first inner tube. During travel, the deflated second inner tube flattens against the first inner tube which continues to remain inflated. The wheel, provided with such a pneumatic tire, can therefore continue to travel on a road by resting exclusively on the inflated first inner tube even if the outer diameter of the latter is below the edge diameter of the rim flanges (that is to say, it does not project radially outside beyond the level of the rim edges), this because the flattened second inner tube forms a pad or a cushion of a sufficient thickness between the road and the first inner tube or the road and the first inner tube or the edges of the rim flanges.

2. If the pneumatic tire is one that comprises a second inner tube having two secondary annular inner tubes placed side by side around the first tube, the puncture of one of the second tube chambers effects a very rapid or practically instantaneous automatic closing of the aforesaid special valve to prevent the first inner tube from deflating. As the punctured second inner tube deflates, the other (or adjacent) second tube chamber expands and fills the space cleared by the deflated and punctured second inner tube. As a result, the wheel can continue to run on a pneumatic tire inflated practically at standard pressure. In the event that said adjacent or other second inner tube is also punctured, the pair of flattened second inner tubes act as a buffer between the inflated first inner tube and the road.

3. If the pneumatic tire is one that comprises a second inner tube assembly made up of at least one complete circumferential row of small inflatable pockets, the puncture of one or of several of the small pockets causes a rapid automatic closing of each special valve associated therewith, thereby insulating the first inner tube from each punctured small pocket to prevent the deflation of the first inner tube. Gradually with the deflation of each punctured small pocket, the adjacent or neighboring small pockets situated circumferentially on either side of the punctured small pocket expand one toward the other until they join one another by clamping, pinching, or wedging between themselves the small punctured pocket that has flattened. If a plurality of successively adjacent small pockets become punctured, the two closest non-punctured pockets that are still intact and that are situated on either side or at each end of the set of punctured small pockets expand in order to take up the space that has become vacant therebetween. In either instance, the wheel can continue to travel on a pneumatic tire that remains substantially normally inflated. If all of the small pockets of the circumferential row are punctured, the wheel can still continue running on the first or primary inner tube that remains inflated.

4. If the pneumatic tire is one that comprises a second annular inner tube having a pair of circumferential rows of secondary small pockets, then, in the event of a puncture of one of the rows of the second annular inner tube, the special valve cooperating therewith closes automatically and the entire row of non-punctured pockets expands cross-wise to fill the volume left vacant by the punctured pockets that have flattened. The wheel can therefore continue to operate on a pneumatic tire that remains inflated.

5. In all of the preceding instances of puncture, the first or primary inner tube remains inflated as well as in tight bilateral contact with the beads of the pneumatic tire which are wedged against the opposite flanges of the wheel rim. The tire therefore is prevented from separating from the wheel rim.

c. One and the same first inner tube of a given size and one and the same number of small pockets of a second inner tube of a given size are capable of association with several different sizes of pneumatic tires having the identical rim-edge diameter but different cross-sectional widths (for wheels having the same rim width). In this way, with one and the same size of a first inner tube and with one and the same size of a second inner tube having a specified number of inflatable pockets, it is possible to outfit, for instance, pneumatic tires having the following different standard sizes:

135 SR × 12 inches
145 SR × 13 inches
(S = speed up to 180 km/h)
(R = radial carcass)

In the mixed nomenclature system, in accordance with accepted standards, the standardized rated pneumatic tire sizes referred to above, by way of example, comprise two digits, the first one of which expresses in millimeters the approximate size or maximum width of the meridian section of the tire (mounted on a standard rim and inflated to rated pressure), and the second one of which in inches designates the exact diameter under the bead, or the bead edge diameter.

With a growing cross-sectional width of the pneumatic tire, the pockets aforementioned expand respectively crosswise correspondingly so as to fill out the available inner volume of the pneumatic tire in question. However, according to standard practice, pneumatic tires of increasing cross-sectional width are generally mounted on rims of increasing width. Thus, for instance:

a. a 135 × 13 or 145 × 13 pneumatic tire is mounted onto a 4 J 13 or 4 B 13 rim (that is to say, having a width of 4 inches).
b. a 155 × 13 or 165 × 13 pneumatic tire is mounted onto a 4 ½ J 13 rim (that is to say, having a width of 4.5 inches).
c. a 175 × 13 pneumatic tire is mounted onto a 5 J 13 rim (that is to say, having a width of 5 inches).

In this case, the first or primary inner tube expands to a greater extent in a crosswise direction so as to efficiently lock the beads of the pneumatic tire against the edges of the rim; however, the cross-sectional perimeter of said first or primary tube chamber remains fixed because of its inextensibility.

It should be pointed out that, in the case of the standardized rate rim sizes referred to above by way of example, the first numeral expresses the width (in inches) between the rim edges, (that is to say, the width from one edge to the other), whereas the second numeral expresses the rim edge or under-bead diameter (in inches) at the resting site of the pneumatic tire beads.

In the case of pneumatic tires having a rim edge diameter of 14 inches, it is necessary to manufacture a new first or primary inner tube of 14. However, one can use identical small secondary pockets, thereby achieving substantial savings and simplifying considerably storage space since all that is required is to store only one size of the secondary small pockets.

A punctured small pocket can be readily replaced by a new one at a cost that is less than that of an entire inner tube. The punctured small pocket can also be repaired at a later date. It is even possible to replace the spare wheel of a passenger car or of a motor vehicle by a supply of spare small pockets carried along in the car trunk.

In accordance with yet another feature of the invention, the aforesaid first or primary inner tube has in its inflated free state an either circular or at least substantially oval cross-sectional profile with the greater width oriented in the radial direction. Such inner tube further comprises a wall portion or structure preventing or limiting radial expansion (toward the outside) of its peripheral wall in the radially external crown area, the said wall portion or structure being constituted for instance by a circumferential collar of a reinforcement or twill-type texture fabric which is, therefore, substantially inextensible. This oval configuration makes it possible to use one and the same primary inner tube in a more diversified manner such as with ever wider wheel rims, for it provides in all instances a means for bracing the beads of the pneumatic tire against the rim edges with a strength adequate to hold the tire on the rim in all circumstances.

According to yet another feature of the invention, each aforesaid special valve is obtained from a standard or ordinary inflation valve operable by a reversing of the mechanism of the valve in order that it is automatically held open by the return spring and becomes closed by a relative excess of pressure in the aforesaid first or primary inner tube. This arrangement offers the advantage that the major portion of each aforesaid special valve (and in particular its body and its mechanism) can be made of standardized elements or parts existing or available in the trade, thereby achieving considerable savings in the manufacture of such valves.

The instant invention, by creating only special inner tubes constituted respectively of primary and secondary tube chambers that are very simple in manufacture, makes it possible to provide a pneumatic safety tire that is substantially less costly than the pneumatic safety tires presently known in the art and, thereby, more profitable not only in the sale of new pneumatic tires, but also in the sale of spare secondary inner tubes.

Moreover, the present invention is extremely reliable and efficient in operation and is, therefore, of great dependability. Finally, the pneumatic tire in accordance with the invention is far lighter in weight than the pneumatic safety tires presently known in the art which has a favorable effect on its handling pattern, its road-holding ability, travelling comfort, and its effect on the vehicle.

BRIEF DESCRIPTION OF THE DRAWINGS

The present invention will be better understood, and other objects, characteristics, details and advantages of the invention will become more readily apparent upon reading the description that follows with reference to the drawings, in which.

DETAILED DESCRIPTION OF THE INVENTION

Figure 1:
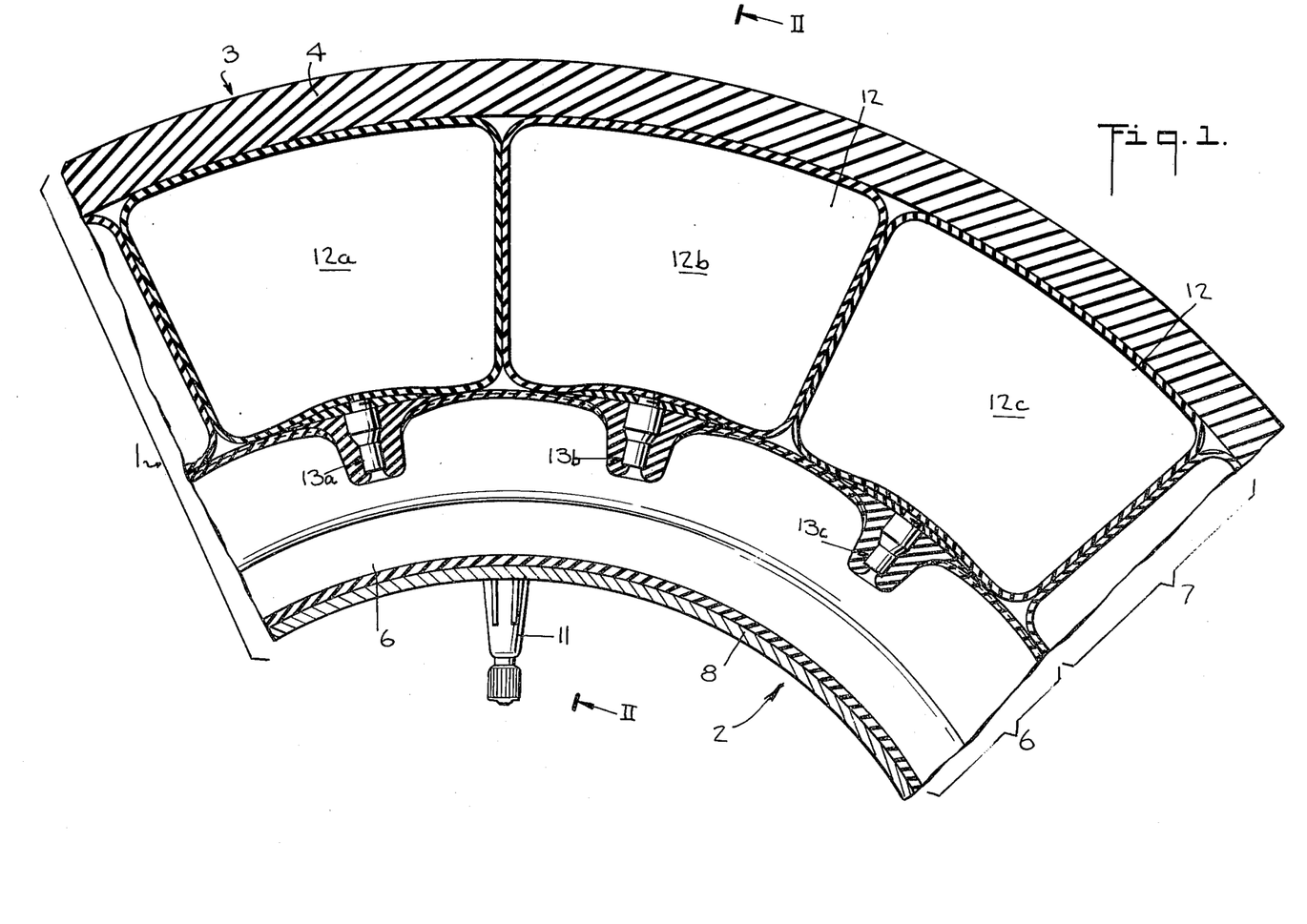
FIG. 1 is a fragmentary view of a cross-section along a median equatorial sectional plane defined by the line I—I of FIG. 2, showing a peripheral portion of the rim of a vehicle wheel (the center having been omitted) outfitted with a pneumatic tire in accordance with one embodiment of the invention and illustrated in its undamaged inflated condition.
Figure 2:
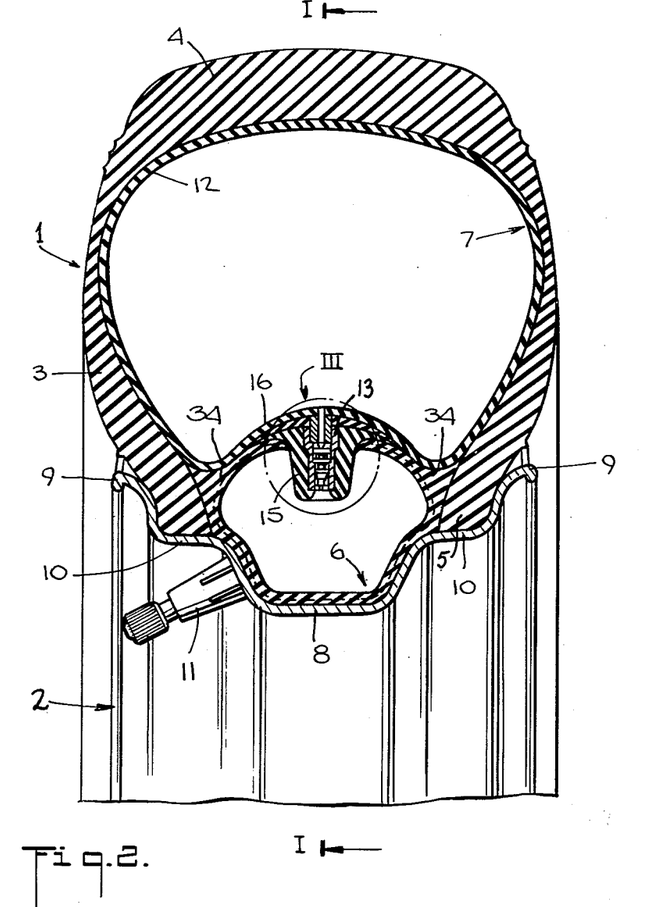
FIG. 2 is a fragmentary cross-sectional view along a meridian or axial plane section defined by the line II—II of FIG. 1.

In accordance with the embodiment illustrated in FIGS. 1 and 2, the pneumatic tire in accordance with the invention, referred to generally by the reference character 1, is mounted on a wheel rim generally designated by the reference 2, which is assumed to be supported by a wheel hub (not shown). The embodiment so illustrated is for instance preferably at least substantially symmetrical with respect to the common median equatorial plane of the wheel rim 2 and of the pneumatic tire 1 mounted on said rim. The pneumatic tire 1 is constituted, on the one hand, by a carcass 3 comprising in particular a tread 4 and a pair of beads 5 by means of which the tire 1 is mounted on the wheel rim 2 and, on the other hand, by a radially internal first or primary inner tube 6 (defining a main chamber, base or internal chamber, support, or master chamber) as well as an assembly of secondary radially external inner tubes 7 (defining satellite, auxiliary, or external chambers).

The wheel rim 2 is preferably, but not necessarily, of the hollow base type comprising a rim bottom 8 in the internal peripheral median or central portion, two external or extreme peripheral lateral edges, for instance upturned edges 9, and two intermediate portions 10 constituting a bead rest and connecting respectively the hollow base 8 of the rim with its edges 9 (see FIG. 2).

The primary inner tube 6, which is shown in this instance has a cross-sectional profile which is in general circular in its free (that is to say unassembled) inflated state and is made of a material that is pliable or flexible but inextensible, and is mounted in the hollow base 8 of the rim 2. It presses against the entire wall surface of said hollow base 8 by projecting laterally (in particular also under the effect of compression through the secondary inner tube assembly 7) and partially overlapping the bead rests 10 so that it comes to rest bilaterally, in the normally inflated condition of the primary chamber 6, on the inner faces of the beads 5 of the pneumatic tire 3 so as to wedge said beads against the rim edges 9.

FIG. 2 illustrates that in the normally inflated state, the primary inner tube 6 can, with its radially external summit portion or crown, extend to some extent beyond the radially external extremities of the rim edges 9 in a direction radially toward the outside. However, this is by no means absolutely necessary. The primary inner tube 6 could quite well be contained entirely in its mounted and inflated state within the apparent contour of the cross-section of the wheel rim 2.

The primary inner tube 6 is provided with a standard or ordinary inflation valve 11 laterally projecting through an appropriate opening in the rim 2. The valve 11 is conventional and mounted in a conventional manner (in particular by means of a valve foot constituting a rubber base) on the primary inner tube 6 at the outside of the latter. The valve 11 contains, in its body, a helicoidal return spring valve mechanism tending to close the valve automatically the moment the external pressure does not exceed the internal pressure of the primary inner tube 6. The valve 11 also opens and is kept open by an external pressure the moment the latter exceeds the internal pressure of the primary inner tube 6. The mechanism comprises futhermore a pin accessible from the outside following removal of the valve cap, making it possible to open the valve manually and deflate the primary inner tube 6.

The secondary inner tube assembly 7 completely and contiguously surrounds the primary inner tube 6 and is placed between the latter and the remaining portion of the available internal free volume of the pneumatic tire 1. The assembly 7 is composed of at least one circumferential row of small inflatable pockets or ballon-like elements or satellites 12 which are preferably similar or identical but independent of one another and arranged contiguously and juxtapositioned in series in the normally inflated state as illustrated in FIG. 1. Each one of the small balloons 12 is made of a pliable or flexible and elastically expandable and contractable material.

In the normally inflated state, each one of the small balloons 12 has at least substantially the shape of a segment of a tubular ring or a hollow torus closed at each extremity by a perpendicular terminal or bottom wall that is for instance substantially radially directed and flat. Thus, its longitudinal cross-sectional profile following particularly the median equatorial plane of the pneumatic tire or following a plane perpendicular to the geometric axis of rotation of the wheel or revolution of the tire, has a configuration substantially of that of a possibly concave and curvilinear isosceles trapezoid.

In the normally inflated state, each one of the small balloons 12 abuts against the internal wall surface of the pneumatic tire 3 as well as the external wall surface of the primary inner tube 6. Each is also in continuous uniform contact through its terminal or extreme transverse opposite faces with the respective corresponding adjoining faces of the two adjacent small balloons 12 between which it is mounted. As a variant, each one of the small balloons 12 could have extreme or bottom transverse walls having a convex bulging shape in the inflated free state.

As shown in FIG. 2, the primary inner tube 6 is preferably bilaterally provided with two peripheral or circumferential, outer, continuous, annular, solid protuberant members 34 constituting small tongues or wings that project sidewise, each one of which having such shapes, dimensions, and relative positions that they fill substantially the residual empty or free space present between the pneumatic tire carcass 3, the secondary inner tube 7, and the primary inner tube 6 in the inflated state so as to provide a suitable support for the secondary inner tube assembly 7. The members 34 may for instance constitute an integral part of the wall structure of the primary inner tube 6; that is to say, they may be made out of one single piece with the latter, for instance by molding or by being attached to the primary inner tube 6 by cementing or vulcanization.

In order to guarantee the tightening and the clamping of the tire beads 5 against the rim edges 9, it is necessary that the transverse width (parallel to the axis of the wheel) of the primary inner tube 6 in the free inflated state be greater than the internal spacing distance of said beads mounted onto the rim, so that the latter is adequately forced against the rim edges. The primary inner tube 6, that has in its free inflated state a circular cross-section, assumes a substantially oval shape extended in a radial direction of the rim and is transversally contracted or retracted the moment the inner tube 6 has been deformed by a transverse lateral compression between the tire beads in the inflated assembled state.

Figure 3:
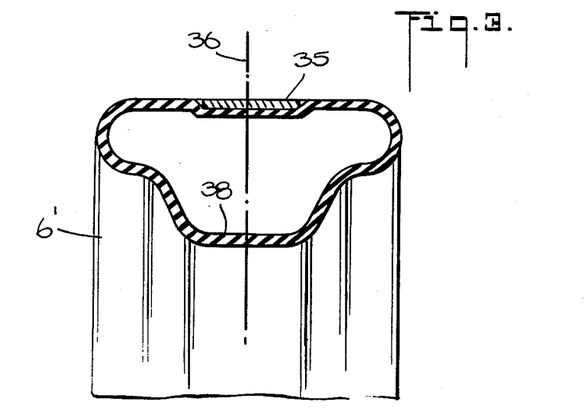
FIG. 3 is a fragmentary cross-sectional view of a primary inner tube according to an alternate embodiment and illustrated in its free or unmounted inflated condition.

In order to improve the locking effect of the tire beads by the primary inner tube 6, its capacity to radially expand is limited so that its capacity to expand transversally is maximized. For this purpose and according to the modified form of FIG. 3, the primary tube chamber 6' has preferably, in its inflated free state, a configuration that is at least substantially oval in the direction of transverse width. This configuration can be achieved in particular by means of a wall portion having a specific structure preventing or limiting the radial expansion (toward the outside) of the central peripheral wall in the radially external crown area. This particular structure can be constituted for instance by a reinforced or twill texture fabric that is substantially inextensible. such a reinforcing structure is incorporated into the wall of the primary inner tube 6' or attached onto same in the form of a strip 35 constituting a belt or a collar extending in an equatorial zone, for instance substantially symmetrical with respect the equatorial plane 36.

Figure 4:
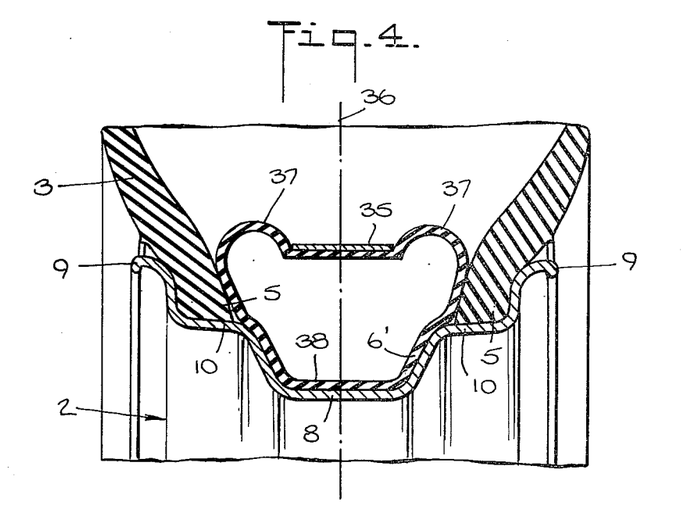
FIG. 4 is a view similar to that of FIG. 2, showing however the primary inner tube in the modified form thereof according to FIG. 3, the set of secondary inner tubes having been omitted to illustrate the shape assumed in that case by the primary inner tube.

FIG. 4, on which there has been omitted the assembly of the secondary inner tube, illustrates the configuration that would actually be assumed by the primary inner tube 6' modified in this manner in its mounted inflated state, in the absence of the small balloons 12. One can note in particular that the direct bearing surface of the primary inner tube 6' against the tire beads 5 is wider because the radial expansion of the chamber is limited by the collar 35 which forces the tube 6' to expand transversely and form a pair of two external lateral bulges 37, one on each side of the central collar 35.

Finally, in order to have the primary inner tube 6' conform closely to the internal cross-sectional shape of the rim, in its inflated mounted state, it is advantageous that it exhibit, in its unmounted inflated state, a radially internal wall portion 38 having a convex shape (set during the manufacturing process), that mates with that of at least a portion of the base 8 of the rim with which it must be in contact in its inflated, mounted state.

Each one of the small balloons 12 is connected, preferably movably, to the primary inner tube 6 by at least one individual special valve 13 serving, on the one hand, to establish or to temporarily interrupt the communication between the small satellite balloon 12 and the primary inner tube 6 and, on the other, to attach the small balloon 12 associated therewith to the primary inner tube 6. To this end, each special valve 13 is permanently integral with the primary inner tube 6, each said valve being preferably arranged in the wall of the radially external crown area of the primary inner tube 6 and situated at least in part inside the latter by penetrating substantially radially into the latter through the wall of the said primary inner tube 6. Each special valve 13 and especially the radially internal wall of its associated small satellite balloon 12 (forming the corresponding part of the assembly of secondary inner tubes 7) is respectively provided with mutually cooperating leakproof connecting means capable of being individually separated or disconnected to achieve at least temporarily a hermetic joint between each small satellite balloon 12 in question and the primary inner tube 6.

Figure 5:
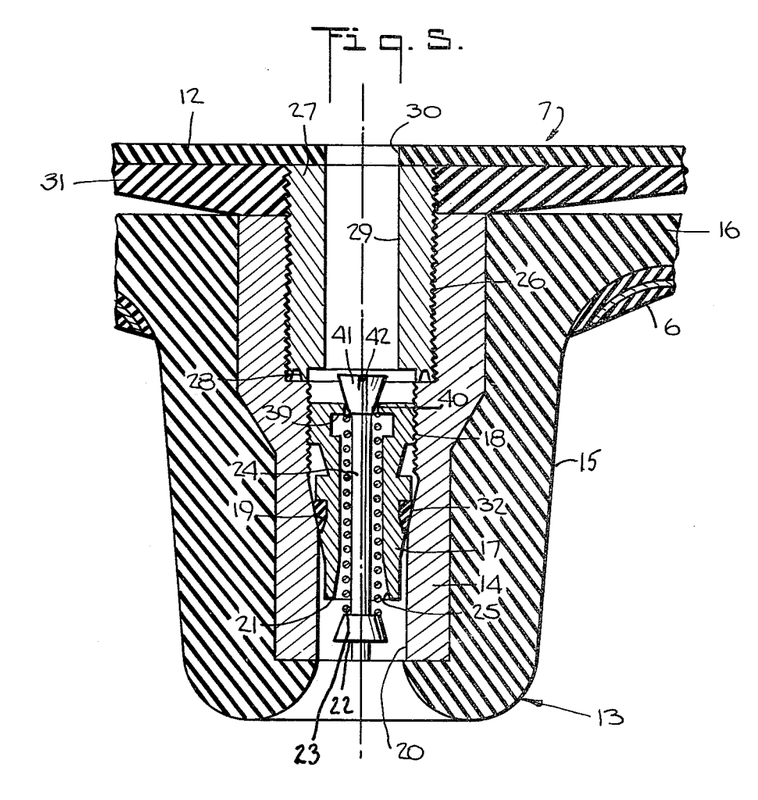
FIG. 5 is a cross-sectional view on a larger scale of the encircled detail III of FIG. 2, representing an aforementioned special valve along a longitudinal or axial section and in its automatic open position.

As shown more particularly in FIG. 5, each special valve 13 comprises, in a known manner, a metal valve body 14, made for instance of coated brass, mounted or embedded by molding in a tubular tip 15 made of rubber which traverses the wall of the primary inner tube 6. Each valve 13 further comprises at its radially external end an enlarged portion 16 constituting a foot, a flange, or a similar edge, and which is welded, cemented, or adhesively bonded to the exterior surface of the primary inner tube wall 6.

Inside the hollow body 14 (which has substantially the shape of a tubular sleeve traversed on either side by a longitudinal or axial duct or borehole), there is mounted the mechanism of the valve 13, which comprises a hollow element having the shape of a casing 17 made for instance of steel that has been inserted into the hollow body 14 and screwed by a radially external threaded end portion into a threaded portion 18 of the axial borehole of the hollow body 14. Leakproof tightness between the smooth or unthreaded radially internal portion of the sleeve 17 and the corresponding smooth internal wall of the borehole of the hollow element 14 is provided by an annular gasket 19 mounted inside a circumferential groove or throat provided in the outer surface of the sleeve 17. As a variant, the ring 19 could be mounted inside an internal throat of the borehole 20 of the body 14 and be in elastic or compressed contact with the outer surface of the sleeve 17.

The terminal surface of the radially internal end of the casing 17 constitutes with the edge of its borehole an annular valve seat 21 against which a plug-like element 22 is capable of axially engaging. The element 22 is shaped and is elastically forced back toward the radially internal side of the primary inner tube 6 into its open position (as shown on FIG. 5) by at least one return spring, for instance a helicoidal compression spring 23 coaxially surrounding the stem rod 24 of the valve 22. The spring 23 is braced by its radially internal end against the valve head 22 and, with its opposite or radially external end, against an internal annular shoulder 39 of the borehole 25 of the sleeve 17. The valve stem 24 extends from the valve head 22 in a radially external direction and is movable axially along the bore 25 in the sleeve 17. The bore 25 is of sufficient diameter such that there remains an annular clearance around the stem 24 up to an opening 40 at the radially external end of the bore 25. The bore 25 inside the sleeve 17 therefore constitutes the path for the passage of air through the valve 13 in two opposite directions. The valve rod or stem 24 ends at its radially external extremity in an enlarged or head portion 41 that is for instance truncated or cone-shaped. The head portion 41 constitutes an abutment that is engageable with the edge of the opening 40. The portion 41 is preferably provided with one or a plurality of longitudinal grooves 42 allowing for the passage of air when the head portion 41 abuts against the sleeve 17.

The spring 23 must be calibrated so that its force is relatively weak so that the valve 22 can close under the effect of an excess of pressure of, for instance, 0.3 atmospheres within the primary inner tube 6 with respect to the pressure prevailing in the associated small satellite balloon 12 as a result of a puncture of the latter. The valve 13 is in this manner relatively sensitive to variations of the pressure in its small satellite balloon 12.

Each of the aforesaid connecting means between a given small satellite balloon 12 and the primary inner tube 6 is preferably constituted of two connectable linkage elements such as an instantaneous pawl type automatic unit with a quick-action locking capacity, or a screw-type assembly with the said elements comprising for instance a male and a female element that can be joined or fitted into one another. The male part can be provided on the small satellite balloon and the female element can be provided on the primary inner tube.

According to the latter embodiment illustrated, the aforesaid female connecting element is formed by the radially external portion of the body 14 of the valve 13 that is integral with the wall of the primary inner tube 6. That portion is provided with an internally threaded hole or bore 26 that is substantially coaxial with the valve 13 and communicates with its mechanism. The opening 26 is accessible and open on its radially external side while the aforesaid male connecting element is constituted of a metallic hollow metal or similar tubular sleeve 27 made for instance of brass that is externally threaded substantially along its entire length. The sleeve 27 is integral and leakproof at its radially external end with the radially internal wall of the associated small satellite balloon 12 (constituting the corresponding portion of the aforesaid secondary inner tube assembly) and projects radially outside the small balloon.

The sleeve 27 can be screwed completely into the threaded hole 26 extending substantially coaxially with the inside bore 20 of the valve body 14 as an aligned prolongation of the latter. In the completely screwed-in position, the sleeve 27 abuts with the terminal face of its radially internal end against an annular packing or gasket 28 placed against an internal shoulder of the opening 26.

The axial borehole 29 of the sleeve 27 communicates with the inside cavity of its associated inflatable small satellite balloon 12 via an orifice 30 traversing the wall of each small balloon and having a diameter corresponding substantially to that of the borehole 29 of the sleeve 27. The sleeve 27 is preferably embedded, in particular by means of molding, with one extremity in a rubber base 31 that is welded, cemented, or adhesively bonded to the outer rubber surface of its associated small satellite balloon 12. The base 31 is vulcanized onto the sleeve 27. By the same token, the rubber tip 15 is vulcanized on the body 14 of the valve 13.

Because of this arrangement, each one of the small balloons 12 can be readily mounted onto and dismantled from the primary inner tube 6 simply by screwing or unscrewing the sleeve 27 by rotating the small balloon in one direction or the other. It will be understood that the components of the valve 13 and the sleeve 27 could be made of plastic instead of metal. The moment the sleeve 28 is screwed completely into the body 14 of the valve 13, the base 31 presses at least against the end cross-face of the radially external end of the valve housing 14 as illustrated in FIG. 5. It ought to be noted that the axial bore 20 of the valve housing 14 has a concave truncated intermediate inner wall 32 converging toward the radially internal side and situated substantially at the level of the gasket 19. Thus, by introducing and by screwing the sleeve 17 into the valve housing 14 from the outside through the opening 26, the gasket 19 is gradually tightened against the conical bearing 32. Moreover, the rubber tip 15 covers or overlaps the solid annular portion of the terminal cross-surface at the radially internal end of the valve housing 14 thereby functioning as a protector pad or bead to prevent a possible contact by the hard or metallic internal end of the valve 13 with the radially internal opposite wall of the primary inner tube 6 in the event of a collapse or a flattening of the primary inner tube 6.

The mode of operation of the pneumatic safety tire in accordance with the present invention is described below assuming that, originally, the pneumatic tire is in a completely deflated state. In order to inflate the pneumatic tire, all that is required is to introduce compressed air through the ordinary inflating valve 11. Initially, all the special valves 13 are kept open through their respective return springs 23 so that the compressed air can inflate simultaneously the primary inner tube 6 and all of the small satellite balloons 12. At the end of the inflation operation, the moment the proper inflation pressure has been attained, the valve 11 is separated from the source of compressed air to which it has been connected, and all of the valves 13 remain open as a result of the pressure equilibrium prevailing within the primary inner tube 6 and within the small balloons 12, all of which communicate with the primary inner tube 6 and, accordingly, with one another through the primary inner tube.

The primary inner tube 6, therefore, assures at all times an even or uniform distribution of the pressure within the various small balloons 12, thereby automatically balancing out local variations of pressure that are likely to arise during travel as a result of the local deformations which the small balloon 12 may experience one after the other as a result of a partial flattening the moment the corresponding portion of the tread 4 comes in contact with the ground. The configuration of the assembly is then in general the one illustrated in FIG. 1 where one can see in particular three successive complete small balloons 12a, 12b, and 12c.

In the event of a puncture of a small balloon 12, for instance the balloon 12b, as a result of the perforation of its radially external wall by a nail or a similar sharp-tipped element 33 that has pierced the tread 4 (see FIG. 6), the small balloon 12b that has been affected deflates. The deflation is accelerated or assisted by the bilateral compression experienced by the small balloon 12b between the two adjacent small balloons 12a and 12c which tend to expand one toward the other.

Figure 6:
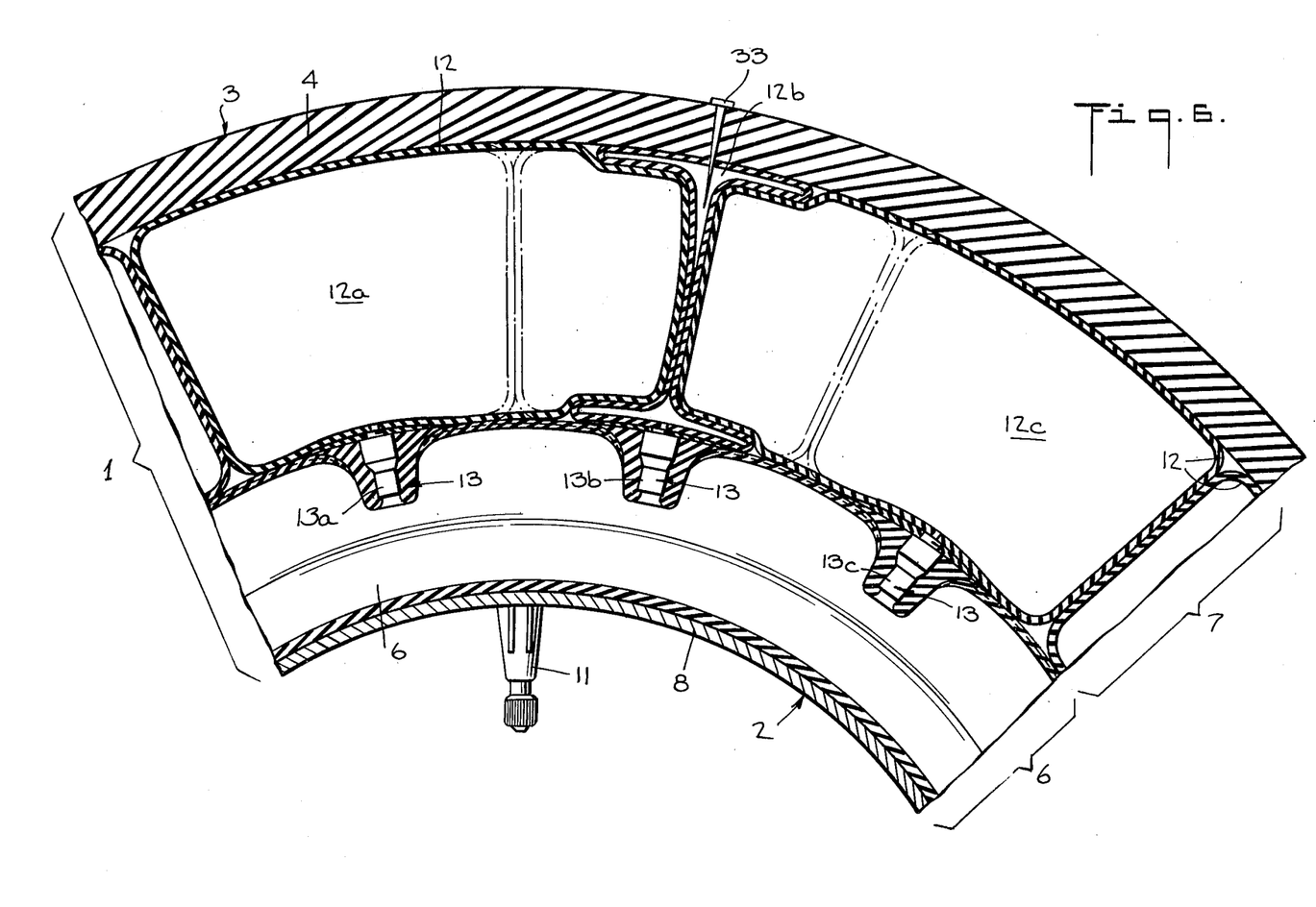
FIG. 6 is a view similar to that of FIG. 1 showing, however, a pocket of the pneumatic tire in a punctured state caused by a nail that has pierced the tread.

In FIG. 6, the initial configuration (prior to perforation) of the small balloons 12a, 12b, and 12c, as shown on FIG. 1, are illustrated by discontinuous dash-dot lines.

The deflation of the punctured small balloon 12b causes a drop of pressure in the latter, thereby bringing about the immediate closing of the associated special valve 13b because of the greater pressure prevailing inside the primary inner tube 6. The greater pressure in the tube 6 overcomes the opposing force of the return spring 23 and forces the valve 22 back into its closed position against its seat 21. The punctured small balloon 12b is in this manner isolated from the primary inner tube 6 so that the latter cannot be deflated. Gradually with the deflation of the small balloon 12b, the two neighboring or adjacent small balloons 12a and 12c on either side of the small ballon 12b expand (owing to the elastic nature of their rubber wall) toward one another by pushing or forcing back the opposite corresponding walls of the small balloon 12b. The final configuration of the small balloons 12a, 12b, and 12c has been illustrated by the solid continuous lines in FIG. 6. In this way, the volume that has initially been taken up by the small balloon 12b in the inflated state prior to puncture is finally taken up (substantially except for the volume of the material constituting the small balloon), following a puncture, by the adjacent extreme portions of the neighboring small balloons 12a and 12c.

The special valves 13 that are respectively associated with the other small satellite balloons 12 remain open thereby permitting the primary inner tube 6 to continue in effective operation. By the same token, if for any reason an air leak occurs in a small satellite balloon 12 (for instance, its wall has become porous), the valve 13 associated with such defective satellite balloon closes automatically and the adjacent or neighboring small satellite balloons 12 expand simultaneously toward one another as discussed above. The tire can, thus, continue to be used in an operative condition.

In order to replace a punctured or defective small balloon, it is necessary to first deflate the pneumatic tire 1 by opening and by keeping manually opened the valve 11, thereby bringing about the simultaneous deflation of the undamaged small balloons 12 through their associated special valves 13 and the primary inner tube 6. One can then dismantle the pneumatic tire 3 from the wheel rim 2 and remove the assembly of the primary inner tube 6 and the small balloons 12 from the tire. The defective small balloon can then be removed by turning it so as to unscrew its associated sleeve 27 from its associated special valve 13. One can then proceed with replacing the defective small balloon with a new small balloon.

It is obvious that the moment a small balloon 12 has been punctured, the overall inflation pressure of the pneumatic tire becomes slightly reduced. In the event that all of the small balloons are punctured, the pneumatic tire can still operate on the road by resting on its primary inner tube 6 which remains inflated at a pressure which is however slightly below the initial inflation pressure there as a result of the leak occurring during the period of closing of the valve. As a matter of fact, the moment a small satellite balloon 12 becomes deflated as a result of a puncture, the mass of air contained in said small balloon is lost, thereby bringing about a reduction in the remaining inflation pressure. Indeed, the respective volumes of the other small balloons increase through expansion of the latter, said increase in overall volume continuing to correspond to the initial volume of the punctured small balloon (neglecting the volume taken up by the material constituting the punctured balloon).

Assuming that the pneumatic tire comprises a number $n$ of small satellite balloons 12, the rated air inflation pressure $P_0$ corresponds initially to a total inside volume of $V + n(v)$ (where $V$ denotes the volume of the primary inner tube 6 and $v$ the volume of each small satellite balloon 12). At the moment a small balloon 12 is punctured, the balance of the volume $V + (n-1)v$, which had been at the initial pressure $P_0$, increases by the value of the volume $v$ of the punctured small balloon to become equal to an overall volume $V + n(v)$ at a new pressure $P_1$ (lower than $P_0$) which, according to Mariotte's Law, is equal to:

$$P_1 = P_0 \frac{V + (n-1)v}{V + n(v)}.$$

Following a puncture of $i$ small balloons, the residual pressure therefore becomes:

$$P_i = P_0 \frac{V + (n-i)v}{V + n v}.$$

It will be understood that the foregoing description of a preferred embodiment of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. An inner tube assembly for a pneumatic tire, said assembly comprising an annular primary tube means, primary valve means connected to and communicating with the interior of said primary tube means, secondary tube means surrounding said primary tube means, and secondary valve means interconnecting and communicating with the interiors of said primary and secondary tube means, said secondary valve means remaining open and intercommunicating the interiors of said primary and secondary tube means for as long as there remains an equilibrium of pressure therebetween, said secondary valve means including closure means for pneumatically isolating the interiors of said primary and secondary tube means from one another when there occurs a pressure drop in said secondary tube means relative to said primary tube means, said secondary valve means including a housing having a pair of coaxially open ends, an elongate rod supported for endwise movement in said housing and defining with the interior of said housing an annular space, said rod including a pair of enlarged heads coaxially spaced from one another over a distance that is greater than the spacing between said opposite open ends of said housing, spring means surrounding said rod between said heads, one of the ends of said spring means being engageable with one of said heads of said rod, the other end of said spring means being engageable with the interior of said housing adjacent to one of said open ends of said housing, said spring means urging said rod into a position at which one of said heads of said rod engages one of said open ends of said housing, the latter said head being diametrically larger than the latter said open end and including groove means for intercommunicating the exterior of said housing with the interior thereof when the latter said head is engaged with the latter said open end, the opposite one of said heads also being diametrically larger than its corresponding one of said open ends of said housing and held remote from the latter by said spring means when the other head engages its corresponding one of said open ends of said housing, said head which is held remote from its corresponding open end of said housing by said spring means confronting the interior of said primary tube means and being movable in response to pneumatic pressure thereagainst into engagement with its corresponding open end of said housing to close the latter said open end and pneumatically isolate the interiors of said primary and secondary tube means from one another.

2. An inner tube assembly as claimed in claim 1, wherein said secondary tube means includes a plurality of inflatable balloon-like pockets abutting one another in a circumferential array around said primary tube means.

3. An inner tube assembly as claimed in claim 2, wherein said secondary valve means includes a plurality of valves each of which is associated with a respective one of said pockets.

4. An inner tube assembly as claimed in claim 3, wherein each of said pockets is detachable from one another and from said primary tube means.

5. An inner tube assembly as claimed in claim 4, wherein each of said pockets is made of an expandable material.

6. An inner tube assembly as claimed in claim 5, wherein said secondary tube means includes a further circumferential array of abutting pockets surrounding said primary tube means and adjacent to the first said circumferential array of pockets.

7. An inner tube assembly as claimed in claim 1, including support means for securing said housing in intercommunicating relation with the interiors of said primary and secondary tube means, said support means including an open ended hollow projection secured to said primary tube means, a hollow internally threaded sleeve fixedly confined in said projection, said housing having external threads threadedly associated with the lower threaded portion of said sleeve, and an externally threaded cylinder threadedly secured at one end to said secondary tube means and at its opposite end in coaxial relation with said housing to internal threads of said sleeve.

8. A valve assembly comprising a housing having a pair of coaxially opposite open ends, an elongate rod supported for endwise movement in said housing and defining with the interior of said housing an annular space, said rod including a pair of enlarged heads coaxially spaced from another over a distance that is greater than the spacing between said opposite open ends of said housing, spring means surrounding said rod between said heads, one of the ends of said spring means being engageable with one of said heads of said rod, the other end of said spring means being engageable with the interior of said housing adjacent to one of said open ends of said housing, said spring means urging said rod into a position at which one of said heads of said rod engages one of said open ends of said housing, the latter said head being diametrically larger than the latter said open end and including groove means for intercommunicating the exterior of said housing with the interior thereof when the latter said head is engaged with the latter said open end, the opposite one of said heads also being diametrically larger than the corresponding one of said open ends of said housing and held remote from the latter by said spring means when the other head engages its corresponding one of said open ends of said housing, said head which is held remote from its corresponding open end of said housing by said spring means being movable in response to pneumatic pressure thereagainst into engagement with its corresponding open end of said housing to close the latter said open end.

9. An inner tube assembly as claimed in claim 1 including an inextensible, flexible, annular band interposed between said primary and secondary tube means, said band limiting the circumferential radial expansion and optimizing the axial expansion of said primary tube means to a specified amount upon the inflation of the latter via said primary valve means.

* * * * *